(12) United States Patent
Yamazaki et al.

(10) Patent No.: US 7,649,155 B2
(45) Date of Patent: Jan. 19, 2010

(54) PIERCING METHOD FOR LASER BEAM MACHINE

(75) Inventors: Tsunehiko Yamazaki, Niwa gun (JP); Naoomi Miyakawa, Niwa gun (JP)

(73) Assignee: Yamazaki Mazak Corporation, Aichi. pref. (JP)

( * ) Notice: Subject to any disclaimer, the term of this patent is extended or adjusted under 35 U.S.C. 154(b) by 209 days.

(21) Appl. No.: 11/121,435

(22) Filed: May 4, 2005

(65) Prior Publication Data

US 2005/0263502 A1    Dec. 1, 2005

(30) Foreign Application Priority Data

May 26, 2004    (JP)    ............... 2004-155934

(51) Int. Cl.
 *B23K 26/00*    (2006.01)
(52) U.S. Cl. ............... 219/121.71; 219/121.7; 219/121.72
(58) Field of Classification Search ............ 219/121.71, 219/121.7, 121.85, 121.68, 121.67, 121.69, 219/121.72
See application file for complete search history.

(56) References Cited

U.S. PATENT DOCUMENTS

| | | | | |
|---|---|---|---|---|
| 4,469,930 A | * | 9/1984 | Takahashi | .............. 219/121.72 |
| 4,973,819 A | * | 11/1990 | Thatcher | ................ 219/121.78 |
| 5,548,098 A | * | 8/1996 | Sugawara et al. | ...... 219/121.67 |
| 6,027,436 A | * | 2/2000 | Sakaguchi et al. | ............ 493/62 |
| 6,462,301 B1 | * | 10/2002 | Scott et al. | ............ 219/121.67 |
| 6,483,075 B1 | * | 11/2002 | Yamazaki et al. | ...... 219/121.82 |
| 6,515,253 B1 | * | 2/2003 | Battaglia | ............... 219/121.67 |
| 6,777,641 B2 | * | 8/2004 | Cole et al. | ............ 219/121.67 |
| 6,922,420 B2 | * | 7/2005 | Yamazaki et al. | ............. 372/25 |
| 6,930,275 B2 | * | 8/2005 | Yamazaki et al. | ...... 219/121.67 |

FOREIGN PATENT DOCUMENTS

| | | |
|---|---|---|
| JP | 07-223084 | 8/1995 |
| JP | 2003-334678 | 11/2003 |

* cited by examiner

*Primary Examiner*—M. Alexandra Elve
(74) *Attorney, Agent, or Firm*—Renner, Otto, Boisselle & Sklar, LLP (57) ABSTRACT

A method for performing piercing preferentially on a laser beam machine by taking advantage of a capability to change laser machining tools automatically. A laser beam machine is equipped with a device for changing a torch and nozzle automatically. The laser beam machine is equipped with a means of selecting preferential treatment of piercing after nesting data is prepared by a CAM or NC system and performs piercing alone in favor of cutting by changing to a special-purpose piercing tool.

3 Claims, 9 Drawing Sheets

PIERCING METHOD FOR LASER BEAM MACHINE

The present application is based on and claims priority of Japanese patent application No. 2004-155934 filed on May 26, 2004, the entire contents of which are hereby incorporated by reference.

BACKGROUND OF THE INVENTION

1. Field of the Invention

The present invention relates to a piercing method which makes it possible to enable unskilled operators to operate a laser beam machine, maximize machining quality and productivity for each material and workpiece thickness, accomplish long, unattended operation, and perform piecing preferentially with a special-purpose piecing torch.

2. Description of the Related Art

According to conventional machining methods, machining programs are created by adding machining conditions such as laser intensity, feed rates, piecing conditions to predetermined machining geometries and then machining is performed by specifying one or more created machining programs for material.

When machining predetermined geometries from the middle of material rather than end of the material, holes are pierced at machining start points in the material in order for a laser beam and assist gas to pass the material (hereinafter this process is referred to as "piercing") before starting machining, and then the predetermined machining operations are performed according to the machining programs (hereinafter this process is referred to as "cutting").

When laying out multiple machining geometries with the best yield rate (hereinafter this process is referred to as "nesting") and machining individual geometries, piercing and cutting are performed alternately. Besides, if workpiece thickness is large, piercing takes a long time, building up heat and resulting in machining defects.

Also, when small machining geometries are involved, heat builds up during piercing and cutting, resulting in machining defects.

On the other hand, a method is known in which piercing and cutting are performed by adjusting focal distance according to machining programs (Japanese Patent Laid-Open No. 7-223084 or Patent Document 1).

Generally, optimum machining conditions for piercing and cutting do not coincide. If piercing is optimized, cutting is not optimized. If cutting is optimized, piercing is not optimized. Since a compromise is sought between piercing and cutting, it is impossible to perform both piercing and cutting using optimum values and thus it is impossible to optimize machining quality and productivity.

Also, if piercing is not optimized, piercing takes a long time. This not only reduces productivity, but also causes heat build-up in the workpiece, which in turn will cause machining defects such as degradation of machining quality or even disable machining.

SUMMARY OF THE INVENTION

The present invention provides a piercing method on a laser beam machine which solves the above problems.

A laser beam machine according to the present invention comprises, as basic means, a bed, a pallet which is disposed on the bed and holds a workpiece, a column which moves along an X axis, that is, a longitudinal axis of the bed, a saddle which is supported by the column and moves along a Y axis orthogonal to the X axis, and a machining head which is supported by the saddle and moves along a Z axis perpendicular to the plane formed by the X axis and Y axis.

Besides, it comprises means for performing piecing alone preferentially before performing laser machining.

The preferential treatment of piercing can be selected after nesting data is created.

Since machining conditions can be specified separately for piercing and cutting, the present invention makes it possible to perform piercing and cutting under optimum machining conditions, thereby improving productivity greatly.

Since piercing is optimized, piercing takes a shorter time. This not only increases productivity, but also reduces heat build-up in the workpiece, which in turn will improve machining quality and enable continued stable machining.

DETAILED DESCRIPTION OF THE PREFERRED EMBODIMENTS

Figure 1:
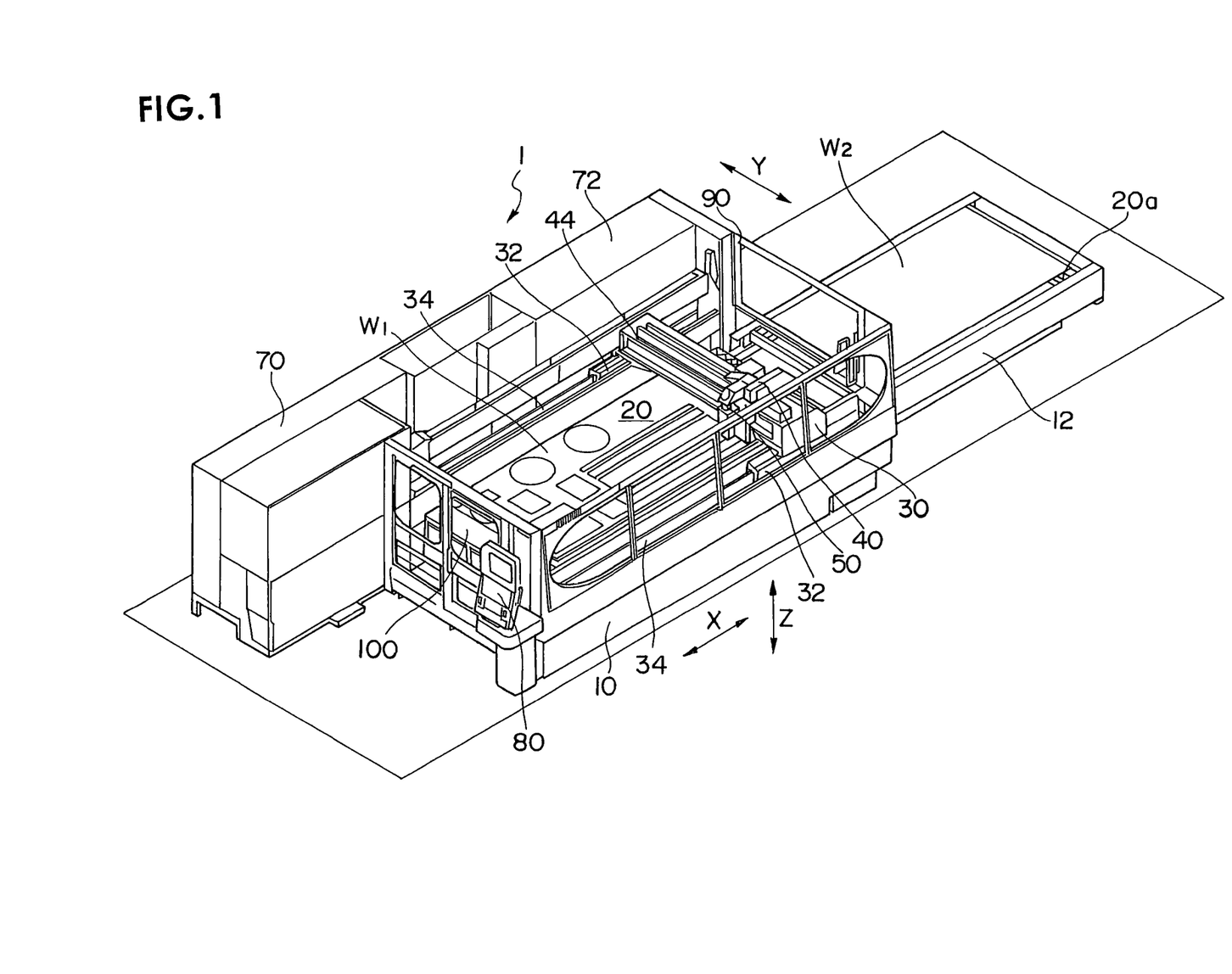
FIG. 1 is a perspective view showing an entire laser beam machine according to the present invention.
Figure 2:
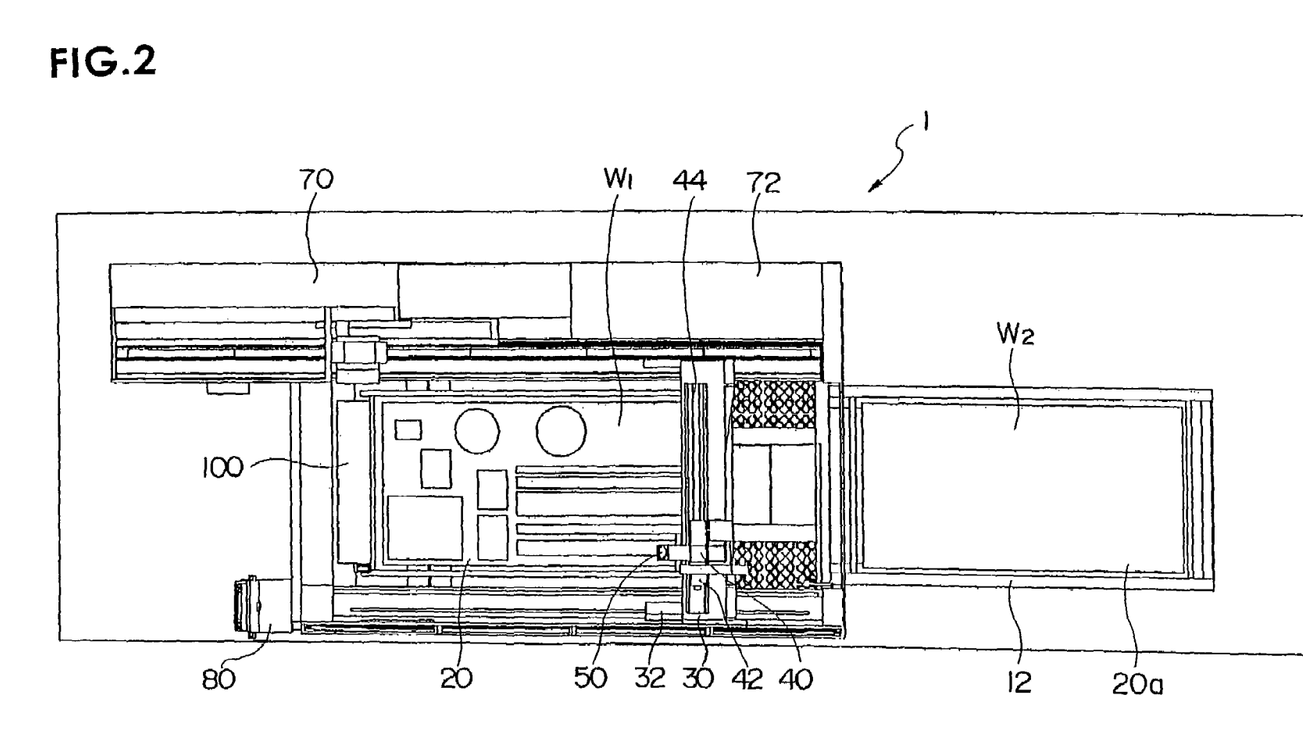
FIG. 2 is a plan view of the laser beam machine according to the present invention.
Figure 3:
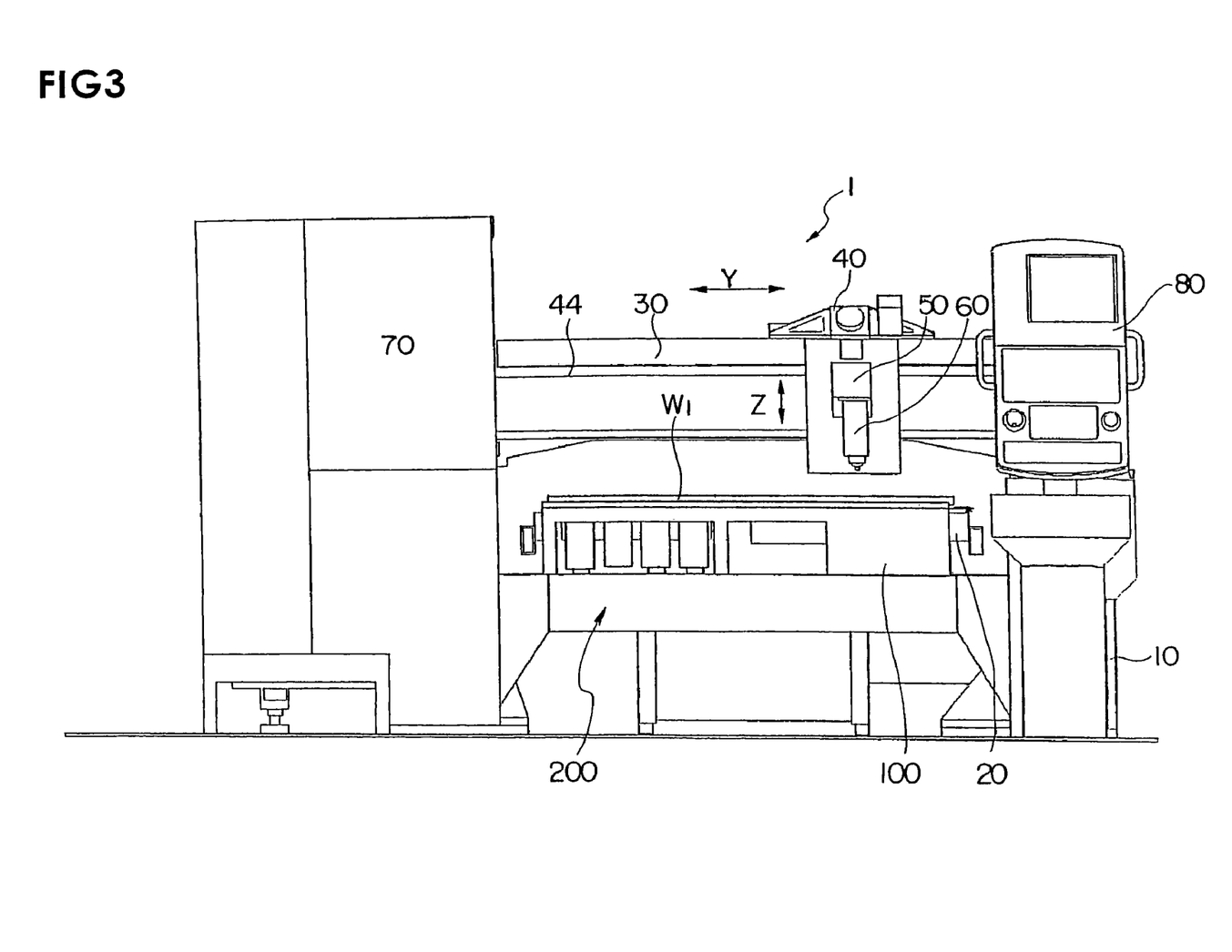
FIG. 3 is a front view of essential part of the laser beam machine according to the present invention.
Figure 4:
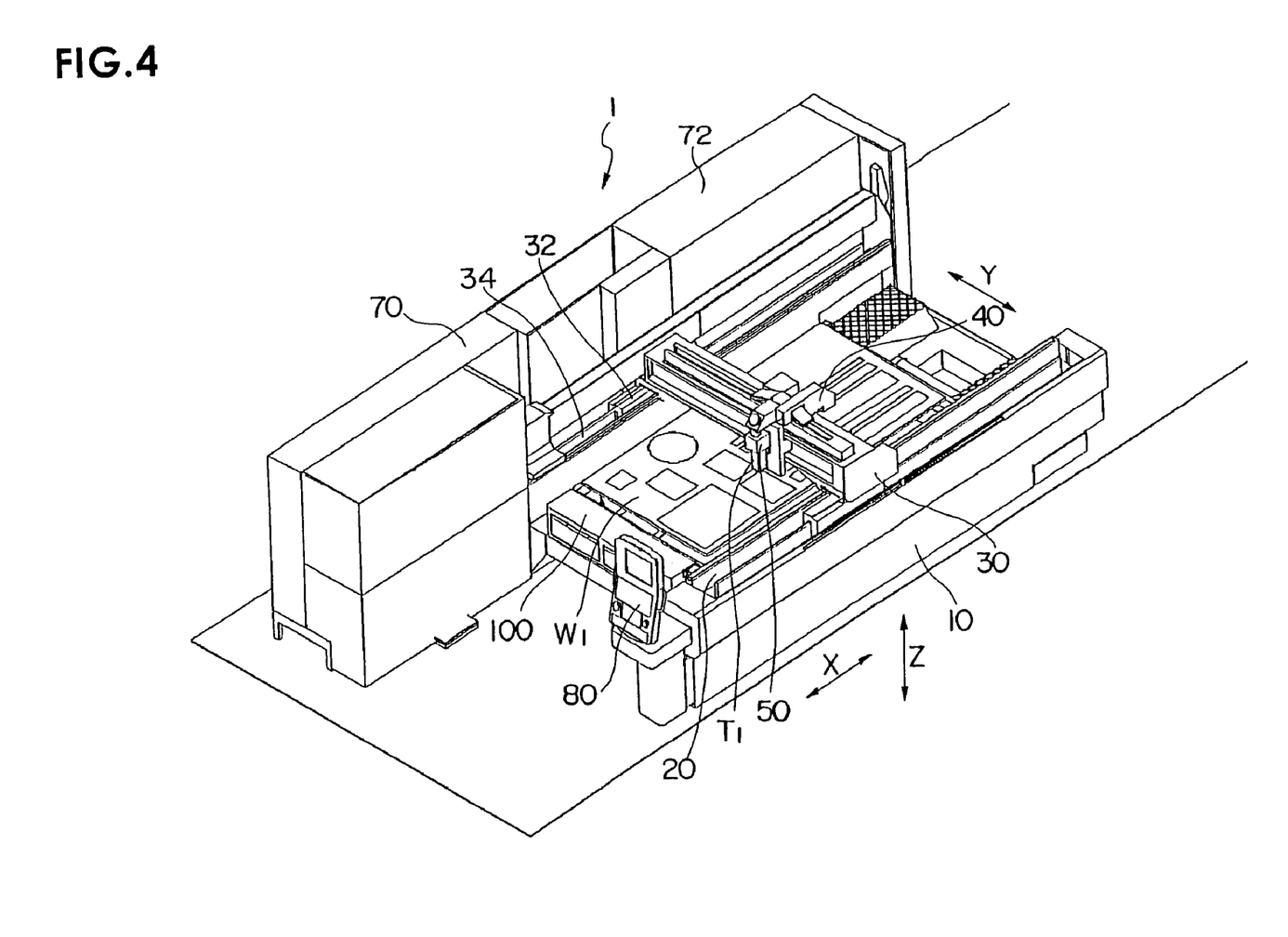
FIG. 4 is a perspective view of the essential part of the laser beam machine according to the present invention.
Figure 5:
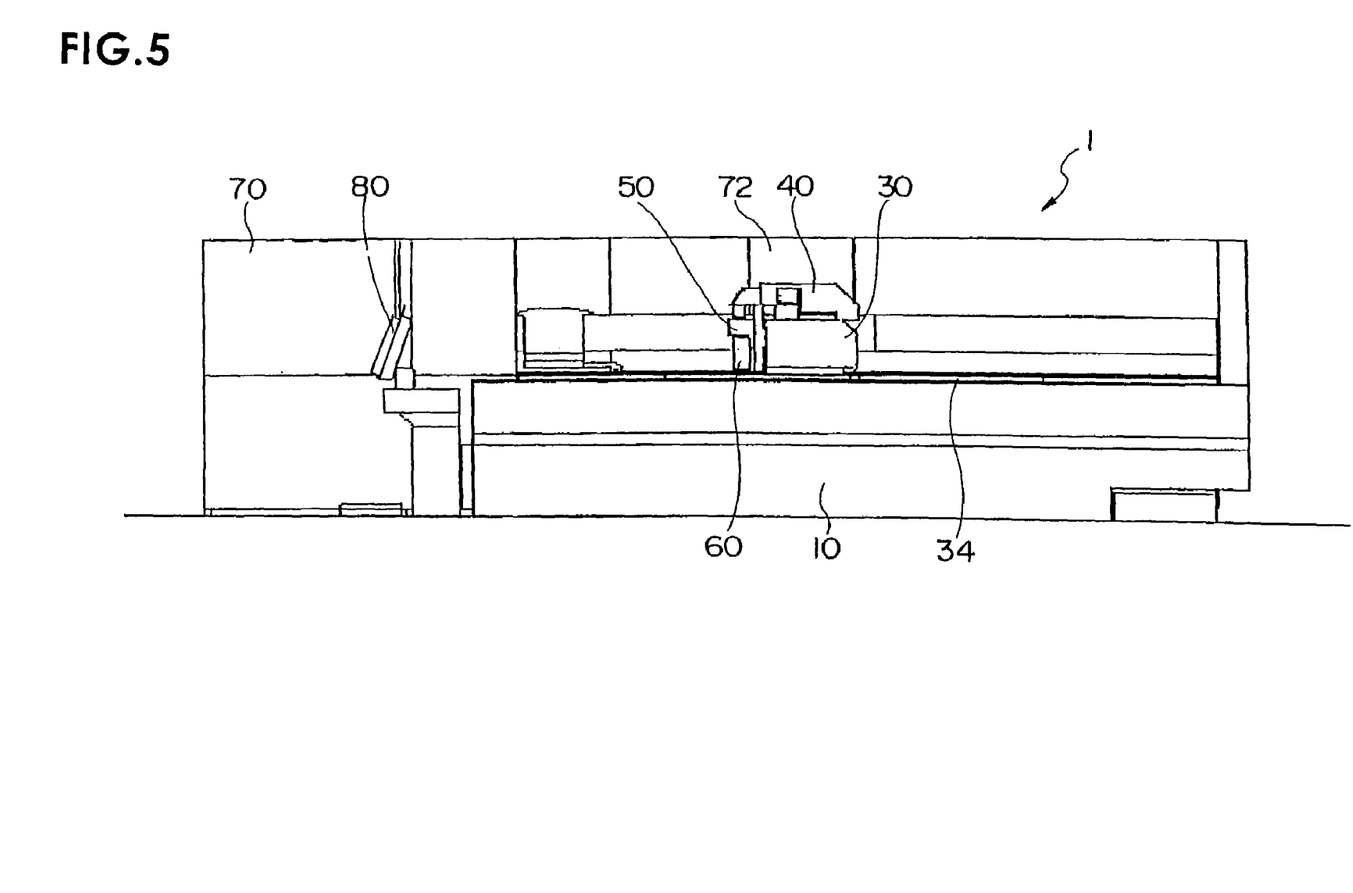
FIG. 5 is a side view of the essential part of the laser beam machine according to the present invention.

FIG. 1 is a perspective view showing an overall configuration of a laser beam machine according to the present invention, FIG. 2 is a plan view, FIG. 3 is a front view, FIG. 4 is a perspective view of the relevant portion, and FIG. 5 is a side view.

A laser beam machine, generally denoted by reference number 1, has a pallet (table) 20 which is disposed on a bed 10 to carry a plate-shaped workpiece $W_1$. A pallet changer 12 is placed on the longitudinal extension of the bed 10, and a pallet 20a carrying a workpiece $W_2$ to be machined next is awaiting its turn.

A pair of guide rails 34 are installed on both sides of the bed 10 along its length and a column 30 is mounted on the guide rails 34 in such a way as to be movable along an X axis.

Means for driving the column 30 along the X axis is provided by, for example, a linear motor, which is formed by a stator installed on the guide rails 34 and a moving member installed on a linear-motion guide 32.

A guide rail 44 is installed on the column 30 along a Y axis orthogonal to the X axis and a saddle 40 is mounted in such a way as to be movable along the Y axis. The saddle 40 is equipped with a linear-motion guide 42 which is engaged with the guide rail 44. A linear motor is formed by the guide rail 44 and linear-motion guide 42.

The saddle 40 has a guide rail installed along a Z axis perpendicular to the plane formed by the X axis and Y axis and has a machining head 50 mounted in such a way as to be movable along the Z axis. The machining head 50 has an optical system which admits a laser beam from a laser oscillator 72.

The machining head 50 is equipped replaceably with a laser machining tool 60. A machining area is fitted with a cover 90 to ensure safety. A power panel 70 and the laser oscillator 72 are disposed adjacent to the bed 10. A control panel 80 for use by the operator to give various commands is disposed on a longitudinal end of the bed 10. A setup station 100 for laser machining tools is installed on that end of the bed 10 which is closer to the control panel 80.

Figure 6:
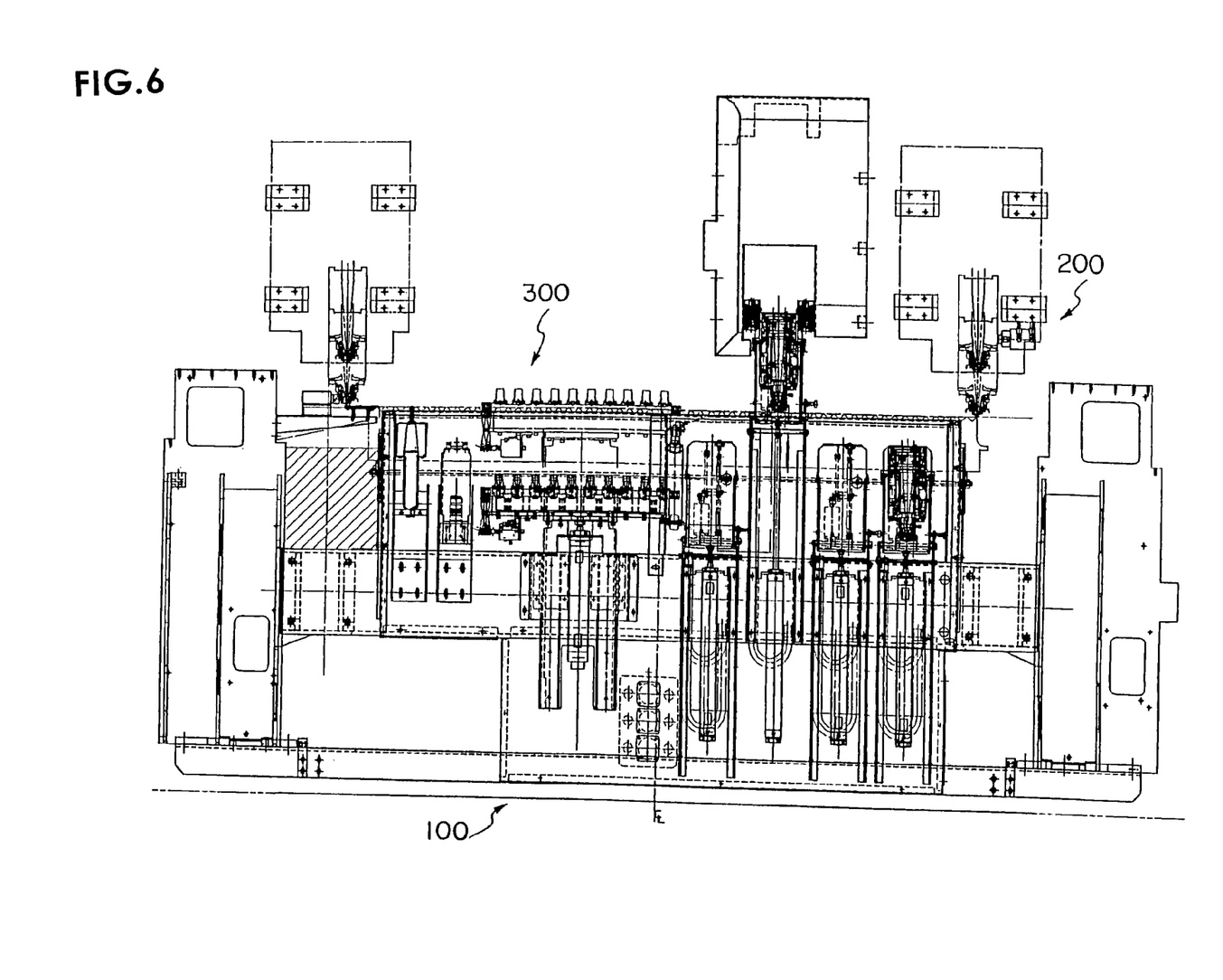
FIG. 6 is a front view of a setup station for laser machining tools.
Figure 7:
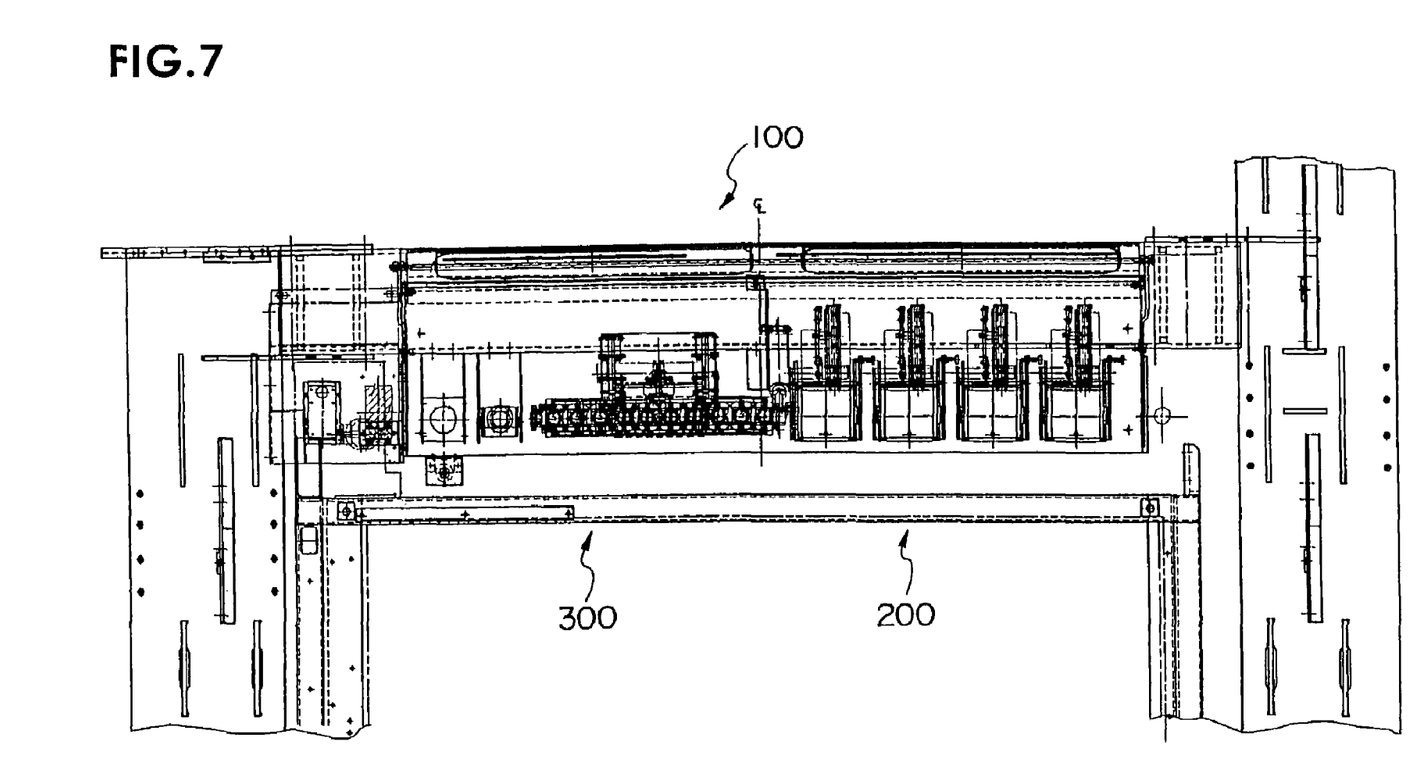
FIG. 7 is a plan view of the setup station for laser machining tools.

FIG. 6 is a front view of the setup station 100 for laser machining tools as viewed from the table and FIG. 7 is a plan view.

The setup station 100 for laser machining tools includes a tool station 200 and nozzle station 300, where the tool station 200 is equipped with a tool change magazine for laser machining tools which in turn are equipped with a torch and nozzle while the nozzle station 300 is equipped with a nozzle change magazine for nozzles of laser machining tools.

Figure 8:
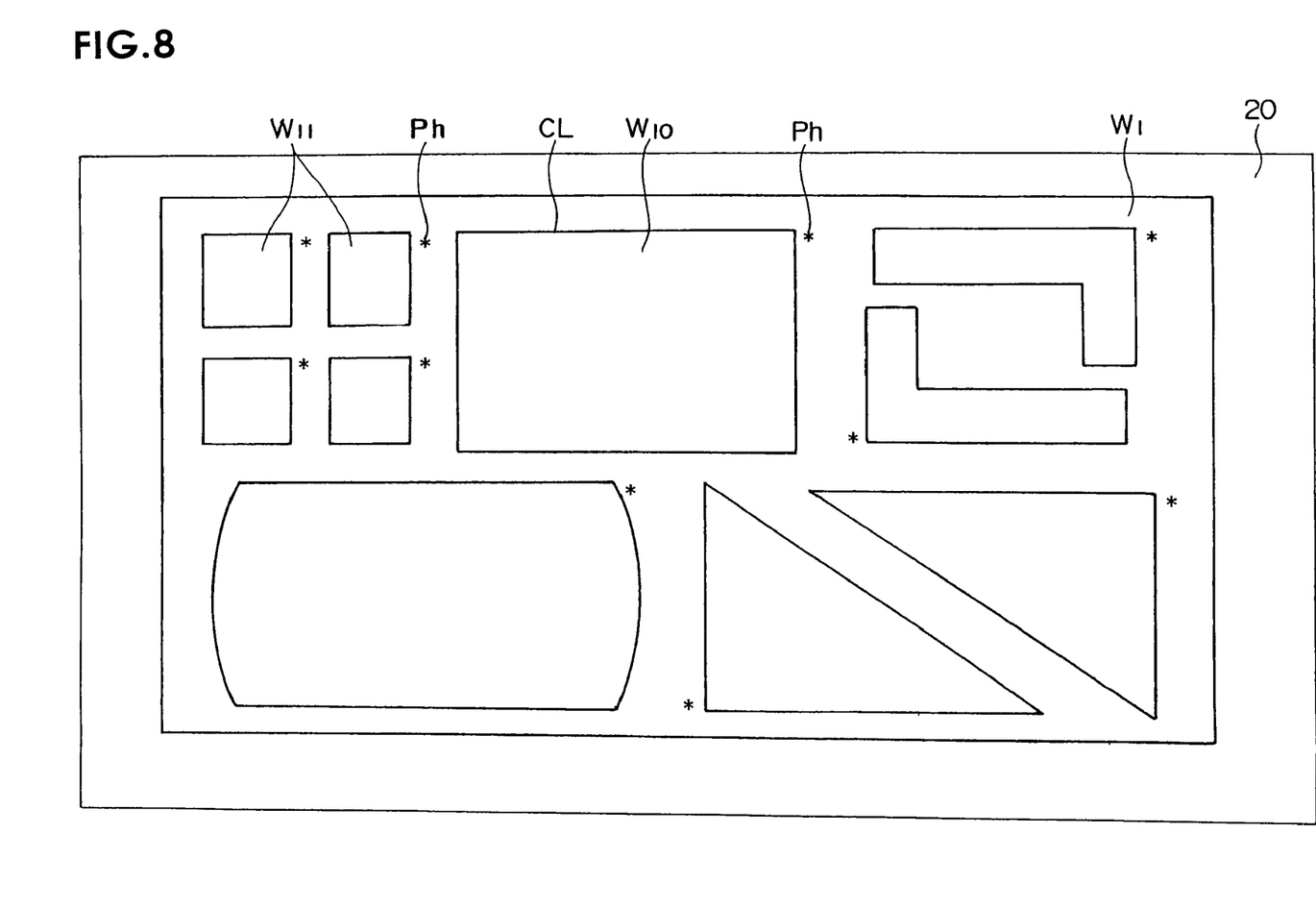
FIG. 8 is an explanatory diagram of a piercing method.

FIG. 8 shows products $W_{10}$, $W_{11}$, etc. laid out (nested) for laser machining on workpiece $W_1$ material mounted on a pallet 20.

Before machining the products $W_{10}$, $W_{11}$, etc., locations of pilot holes Ph to be pierced at machining start points outside of cutting lines CL of the products are determined automatically.

During regular machining, a laser machining tool performs piercing to produce pilot holes Ph and then moves from the pilot holes Ph to cutting lines CL.

The laser beam machine according to the present invention can perform machining by automatically changing laser machining tools among those stored in a plurality of tool magazines.

This makes it possible to prepare special-purpose tools most suitable for piercing and concentrate on piercing.

Figure 9:
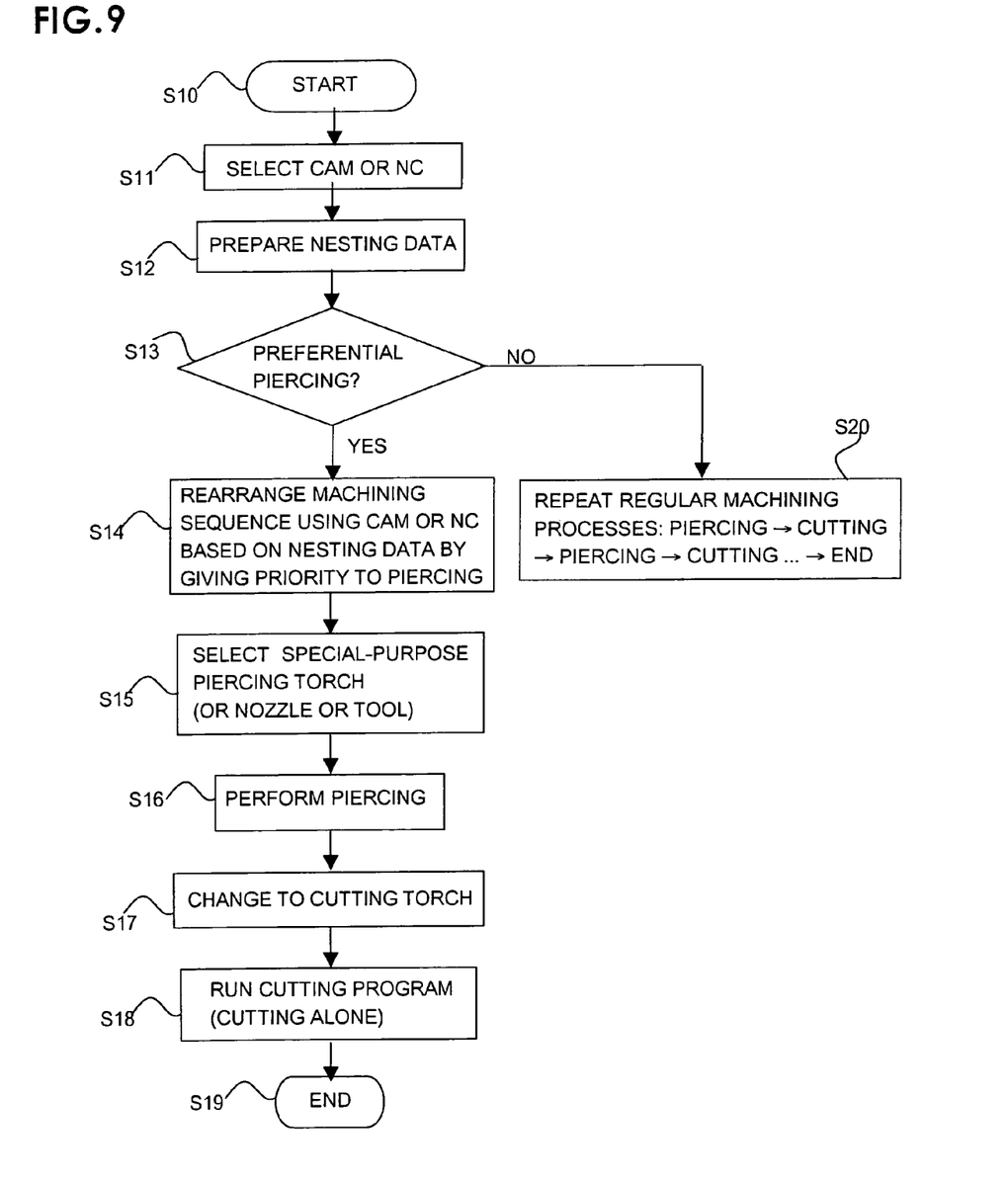
FIG. 9 is a process flowchart of the piercing method.

FIG. 9 is a process flowchart of a preferential piercing method.

In Step S10, processing is started. In Step S11, a CAM or NC system (numerical control system) is selected. In Step S12, nesting data is prepared. In Step S13, preferential piercing is selected. If preferential piercing is not selected, the flow goes to Step S20, where regular machining processes are repeated as follows: piercing→cutting→piercing→cutting.

If preferential piercing is selected, the CAM or NC system rearranges a machining sequence in Step S14 based on the nesting data by giving priority to piercing.

In Step S15, a machining head selects a special-purpose piercing tool. The laser beam machine according to the present invention allows a torch and nozzle of the laser machining tool to be replaced separately. This makes it possible to replace only the nozzle with one suitable for piercing while using a torch intended for cutting.

Piercing is performed in Step S16 and the machining tool is replaced with a torch or machining tool intended for cutting in Step S17.

Cutting is performed according to a cutting program in Step S18 and the processing is finished in Step S19.

Incidentally, although a linear motor has been cited in the above example as a driving means along the X and Y axes, the present invention can also employ a ball screw.

Also, although the preferential treatment of piercing is selected after preparation of nesting data, it may be selected when a CAM or NC system is selected before preparation of the nesting data.

What is claimed is:

1. A piercing method on a laser beam machine that comprises: a bed; a pallet which is disposed on the bed and holds a workpiece; a column which moves along an X axis; that is, a longitudinal axis of the bed; a saddle which is supported by the column and moves along a Y axis orthogonal to the X axis; and a machining head which is supported by the saddle and moves along a Z axis perpendicular to the plane formed by the X axis and Y axis, the laser beam machine being configured to automatically change laser machining tools on the machining head;

the method comprising the steps of performing piercing alone on the workpiece using a special purpose tool for performing piercing, subsequently changing automatically from the special purpose tool to a different tool used for performing laser machining, and thereafter using the different tool to perform laser machining on the workpiece based on nesting data.

2. The method of claim 1, wherein the special purpose tool is most suitable for piercing.

3. The method of claim 1, the laser machining tools each including a torch and a nozzle, and wherein the special purpose tool and the different tool utilize the same torch but include a different nozzle.

* * * * *